United States Patent

Stauffer

(10) Patent No.: US 8,232,003 B2
(45) Date of Patent: Jul. 31, 2012

(54) LEAD-PALLADIUM BATTERY

(76) Inventor: John E. Stauffer, Greenwich, CT (US)

( * ) Notice: Subject to any disclaimer, the term of this patent is extended or adjusted under 35 U.S.C. 154(b) by 713 days.

(21) Appl. No.: 12/423,037

(22) Filed: Apr. 14, 2009

(65) Prior Publication Data

US 2010/0261053 A1 Oct. 14, 2010

(51) Int. Cl.
*H01M 10/22* (2006.01)
(52) U.S. Cl. .................. 429/205; 429/218.2; 429/225
(58) Field of Classification Search .................. 429/205, 429/218.2, 225, 228
See application file for complete search history.

(56) References Cited

U.S. PATENT DOCUMENTS

| | | | |
|---|---|---|---|
| 3,964,927 A * | 6/1976 | Villarreal-Dominguez .. | 429/205 |
| 4,467,020 A * | 8/1984 | Puglisi ..................... | 429/228 X |
| 7,550,231 B2 | 6/2009 | Stauffer | |
| 7,608,361 B2 | 10/2009 | Stauffer | |
| 7,682,737 B2 | 3/2010 | Stauffer | |
| 2005/0233216 A1 | 10/2005 | Stauffer | |
| 2008/0187830 A1 | 8/2008 | Stauffer | |
| 2010/0047697 A1 | 2/2010 | Stauffer | |

* cited by examiner

*Primary Examiner* — Stephen J. Kalafut
(74) *Attorney, Agent, or Firm* — Young Basile Hanlon & MacFarlane PC

(57) ABSTRACT

A storage battery is provided comprising a positive electrode of lead, a negative electrode of palladium, and an electrolyte consisting of an aqueous solution of at least one sulfate salt. Upon charging, lead is converted to lead dioxide and atomic hydrogen is absorbed by the palladium. During discharge, lead dioxide is reduced to the plumbous state and hydrogen is oxidized to hydrogen ions.

4 Claims, 1 Drawing Sheet

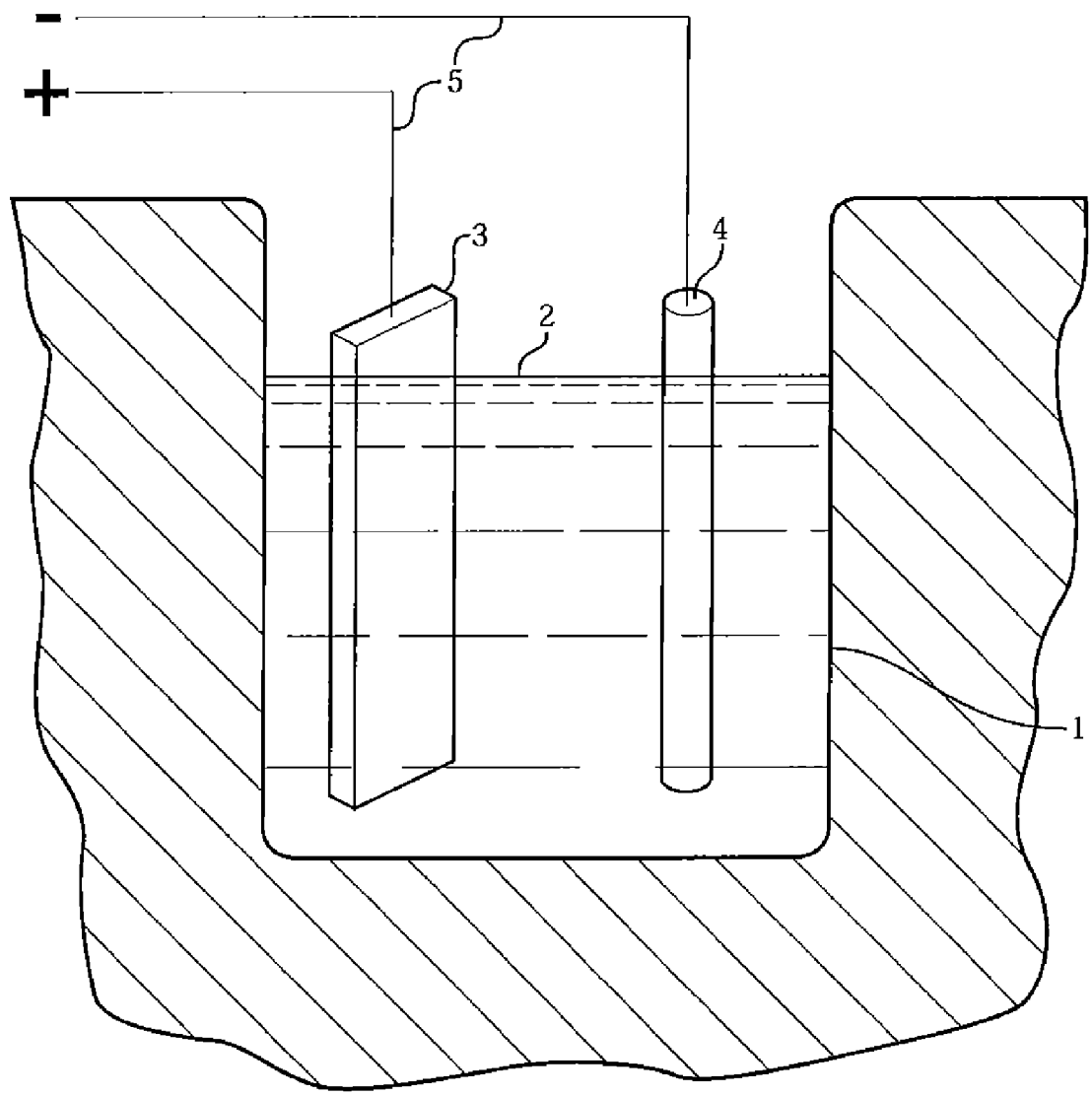

LEAD-PALLADIUM BATTERY

FIELD OF THE INVENTION

This invention relates to a storage battery in which the positive electrode is fabricated from a lead-based material, the negative electrode comprises palladium, and the electrolyte is an aqueous solution of a sulfate salt.

BACKGROUND OF THE INVENTION

The most common type of storage battery, found in almost every vehicle, is the lead-acid battery. This battery comprises a lead dioxide positive electrode, a lead metal negative electrode, and sulfuric acid for the electrolyte. The advantages of the lead-acid battery are numerous. It is low cost, maintenance-free, and provides dependable service over a wide temperature range.

Unfortunately, the lead-acid battery also has its drawbacks; The electrolyte, sulfuric acid, is highly corrosive. The energy density of the battery is low, thus limiting its use in mobile equipment. Finally, its operation is handicapped by the evolution of hydrogen at the negative electrode when the battery is overcharged.

SUMMARY OF THE INVENTION

Pursuant to the invention, a rechargeable battery is provided in which the positive electrode comprises lead-based material, the negative electrode comprises palladium metal, and the electrolyte is an aqueous solution of a soluble sulfate salt. Upon charging, the lead-based material is converted to lead dioxide while atomic hydrogen is absorbed by the palladium. When the battery is discharged, lead dioxide is reduced to lead monoxide or a lead (II) salt, and hydrogen from the palladium electrode is oxidized to hydrogen ions.

The soluble sulfate salt may be a salt of one of the following metals: lithium, sodium, potassium, rubidium, cesium, magnesium and aluminum. This group is not meant to be exhaustive, there being any number of additional soluble sulfates that may qualify. These salts may be used individually or in combination. For example, alum, sodium aluminum sulfate, may be used.

BRIEF DESCRIPTION OF THE DRAWINGS

The description herein makes reference to the accompanying drawings wherein like reference numerals refer to like parts throughout the several views, and wherein:

FIG. 1 is a rendering of the laboratory apparatus used in the investigation of the present invention, also showing the essential components of the battery.

DETAILED DESCRIPTION OF THE EMBODIMENT

The electrochemistry of the present invention is best explained by the reactions that occur at the electrodes during cycling of the cell. In the special case where the electrolyte consists of an aqueous solution of sodium sulfate, the following reactions take plate upon discharge.

At the positive electrode:

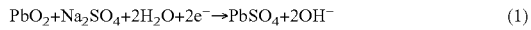

(1)

and at the negative electrode:

(2)

where $PbO_2$ is lead dioxide, $Na_2SO_4$ is sodium sulfate, $H_2O$ is water, $e^-$ is an electron, $PbSO_4$ is lead sulfate, $NaOH$ is sodium hydroxide, $OH^-$ is the hydroxyl ion, $PdH$ is palladium hydride, $Pd$ is palladium, and $H^+$ is the hydrogen ion.

Upon charging the cell, the above reactions are reversed. Atomic hydrogen that is formed at the negative electrode is absorbed by the palladium. This metal has the unique capability of absorbing up to 900 times its own volume of hydrogen at room temperature. Whether the absorbed hydrogen is chemisorbed or forms a palladium hydride compound is not known for sure. In any case, the absorption is reversible so that on discharge, the palladium releases the hydrogen as shown in equation 2.

Any soluble sulfate can be used in the battery of the present invention. Thus, instead of the sodium salt shown by the above equations, salts of other alkali metals might be used. Although the reactions are similar for all of these salts, slight differences, as measured by cell potentials, might be observed. In addition, the solubility of the selected salt is a factor. For example, 167 gm. of cesium sulfate is dissolved in 100 ml. of water at 0° C. This result compares with a value of 7.35 gm. for potassium sulfate.

The palladium electrode can be used in pure form or alloyed with other metals. One consideration is the cost of palladium. If less expensive materials can be partially substituted for palladium, this approach will be of interest. In any case, the electrochemistry must be favorable.

Candidates for palladium alloys include the platinum group metals (PGM). Platinum, in particular, has shown catalytic properties similar to those of palladium, and it is frequently used in palladium alloys. Other than PGM, nickel is especially noteworthy. This metal shares notable properties with palladium. It is a catalyst for hydrogen oxidation, and it exhibits good resistance to corrosion.

A prototype of a functional battery is shown in FIG. 1. Apparatus similar to that shown was used in the experimental work. The cell casing 1 holds the electrolyte 2. The positive electrode 3, fabricated from a sheet of lead, is immersed in the electrolyte. The negative electrode 4, comprised of a rod of palladium, also is immersed in the electrolyte. Electrical leads 5 are connected to both electrodes to conduct the current.

An example would be as follows: An experimental cell was fashioned from a glass jar 2½ in. diameter by 4 in. high. The positive electrode was a strip of lead 1½ in. wide by 4 in. long. The negative electrode was a rod of palladium of 99.95% purity ¼ in. diameter by 4 in. long. The electrolyte was prepared by dissolving 72.2 gm. of lithium sulfate monohydrate ACS in 200 ml. water. After charging the cell at 2.8 volts for ten minutes, an open circuit potential of 2.35 volts was realized. The cell was discharged, briefly lighting a flashlight bulb with a current of 70 milliamps.

What is claimed is:

1. A storage battery comprising:
   a. a positive electrode of a lead-based material,
   b. a negative electrode of palladium, and
   c. an electrolyte consisting of an aqueous solution of at least one sulfate salt.

2. The storage battery of claim 1 in which the at least one sulfate salt is lithium sulfate.

3. The storage battery of claim 1 in which the at least one sulfate salt is sodium sulfate.

4. The storage battery of claim 1 in which the at least one sulfate salt is chosen from the group consisting of lithium, sodium, potassium, rubidium, cesium, magnesium and aluminum.

* * * * *